United States Patent
Kim et al.

[11] Patent Number: 5,991,638
[45] Date of Patent: Nov. 23, 1999

[54] BUTTON COVER HOLDING MECHANISM FOR A PORTABLE TELEPHONE

[75] Inventors: Sang-bok Kim, Kyungki-do; Young-Mok Jeoun, Seoul, both of Rep. of Korea

[73] Assignee: SamSung Electronics Co., Ltd., Rep. of Korea

[21] Appl. No.: 08/969,786

[22] Filed: Nov. 13, 1997

Related U.S. Application Data

[63] Continuation of application No. 08/683,240, Jul. 18, 1996, abandoned.

[30] Foreign Application Priority Data

Jul. 20, 1995 [KR] Rep. of Korea .................. 95-21323

[51] Int. Cl.$^6$ .................. H04Q 7/32; H04M 1/00
[52] U.S. Cl. .................. 455/550; 455/90; 455/575; 455/550; 379/433; 379/428
[58] Field of Search .................. 379/428, 433; 455/90, 575, 347, 550; 16/2.1, 29, 18 A, 54, 59, 60, 68, 221, 241

[56] References Cited

U.S. PATENT DOCUMENTS

| | | | |
|---|---|---|---|
| 5,629,979 | 5/1997 | Domoleczny .................. | 379/433 |
| 5,636,275 | 6/1997 | Takagi et al. .................. | 379/433 |
| 5,661,797 | 8/1997 | Leman et al. .................. | 379/433 |
| 5,764,760 | 6/1998 | Grandbert et al. .................. | 379/433 |

*Primary Examiner*—Wellington Chin
*Assistant Examiner*—Keith Ferguson
*Attorney, Agent, or Firm*—Dilworth & Barrese

[57] ABSTRACT

A button cover holding mechanism in which an angle between a button cover and a body is constantly maintained when the button cover of a portable telephone is in an open condition, and the button cover is maintained in a closed condition when the portable telephone is in the closed condition, which is more convenient for a user to open and close the button cover. The button cover holding mechanism of a portable telephone has a cylindrical bush, a cylindrical ring and a spring inserted into circular holes of a button cover, covered with a cover mounting projection, and sealed by an ultrasonic connection technique; such that an opposite cylindrical ring is inserted into a reception guide rail of a body by positioning the cylindrical bush of the button cover toward a projection bar of the body, and the cylindrical bush and the cylindrical ring are outwardly positioned by a restoring force of the spring so that a trough portion of the cylindrical bush is assembled in contact with the projection bar. Wave projections of the cylindrical bush and the projection bar of the body are in contact with each other to directly apply the restoring force of the spring to the cylindrical bush; and the restoring force is generated by a change in a moving distance of the spring according to a phase of the cylindrical bush which causes a moment for rotating the button cover, to open and close the button cover.

13 Claims, 5 Drawing Sheets

BUTTON COVER HOLDING MECHANISM FOR A PORTABLE TELEPHONE

This is a continuation of application Ser. No. 08/683,240 filed Jul. 18, 1996 now abandoned.

BACKGROUND OF THE INVENTION

1. Field of the Invention

The present invention relates to a button cover holding mechanism of a portable telephone, and more particularly to a button cover holding mechanism for opening and closing a button cover which is engaged with a body of the portable telephone.

A button cover holding mechanism of a portable telephone according to the present invention is based on Korean Application No. 21323/95 which is incorporated herein by reference.

2. Description of the Related Art

In the prior art in which portable telephones include a body with dial buttons and function buttons, it has been a disadvantage in that some buttons are unintentionally pressed, thereby causing an erroneous operation of the portable telephone. To prevent such erroneous operation, the body is provided with the button cover so that the button surface is protected from an unintentional external force. Many technologies for the button cover holding mechanism of the portable telephone have been developed, such as described in U.S. Pat. No. 5,257,310.

For example, in the prior art, with reference to FIGS. 1 and 2, a cylindrical bush 32 is inserted into a circular hole 20 of a cover mounting projection 18 of a case 2, and a pipe shaft 30 having a wave cam 40 formed at its inner end is fitted into the cylindrical bush 32. The cylindrical bush 32 is fixed to a hinge portion 34 of the cover 14, and pins 36 are inserted at both sides for preventing rotation of the pipe shaft 30, the cylindrical bush 32 and the hinge portion 34 of the cover 14. Also, two L-shaped bent ends 38a of a spring 38 fixed to the case 2 are fitted into the pipe shaft 30.

If the L-shaped bent ends 38a of the spring 38 are positioned at trough portions 40b and 40d of the wave cam 40 of the pipe shaft 30 of FIG. 2, no elastic force acts on the pipe shaft 30 due to a non-deformation of the spring 38. However, if the L-shaped bent ends 38a are positioned at crest portions 40a and 40c of the wave cam 40 of the pipe shaft 30, elastic force acts on the pipe shaft 30 due to a deformation of the spring 38.

If the end 38a of the spring 38 is positioned at the trough portion 40b of the wave cam 40 of the pipe shaft 30, the cover 14 is maintained in a stable configuration, in which the cover 14 is maintained in a plane parallel to a plane D as shown in FIG. 2, allowing it to remain opened when inclined by 145° with respect to the case 2 parallel to a plane C.

On the other hand, if the end 38a of the spring 38 is positioned at the plane C, the end 38a is in contact with a portion of the wave cam 40 at a position between the crest portion 40a and the trough portion 40d. Accordingly, the elastic force of the spring 38 acts on the pipe shaft 30 in a direction for closing the cover 14, so that the cover 14 is maintained in a closed configuration.

However, in the prior art button cover holding mechanisms of the portable telephone have had disadvantages in which it is difficult to assemble the hinge portion 34, the cylindrical bush 32 and the pipe shaft 30 with respect to one another since the pin 36 should be force-fitted at both sides so as to prevent rotation of the hinge portion 34, the cylindrical bush 32 and the pipe shaft 30 of the cover 14, and also in which an appearance of the portable telephone as a high quality product is compromised since the pin 36 appears exposed.

Also, there have been disadvantages in that the pipe shaft 30 should be manufactured as a material identical with the material of the spring 38 so as to reduce an abrasion of the pipe shaft 30 caused by the friction of the ends 38a of the spring 38 which are in contact with the wave cam 40 of the pipe shaft 30. Accordingly, the pipe shaft 30 should be manufactured by a diecast or a mechanical processing, which increases the product cost as well as the product weight, but which causes the component holding volume of the case 2 to be reduced due to the space occupied by the spring 38, which thus prevents miniaturization of the product.

Moreover, there have been disadvantages in that, when the cover 14 is in a closed condition, an angle range for closing the cover 14 is relatively large (e.g. it may be more than 72.5°) over which the ends 38a of the spring 38 are moved from the trough portion 40d to the crest portion 40a of the wave cam 40 of the pipe shaft 30, which causes inconvenience to the user and which causes the ends 38a of the spring 38 to be in contact with only one portion of the wave cam 40 of the pipe shaft 30, thereby reducing the force for rotating the cover 14.

SUMMARY OF THE INVENTION

It is therefore an object of the present invention to provide a button cover holding mechanism in which an angle between a button cover and a body is constantly maintained when the button cover of a portable telephone is in an open condition, and the button cover is maintained in a closed condition when the portable telephone is in the closed condition, as well as providing more convenience for a user to open and close the button cover.

It is another object of the present invention to provide a button cover holding mechanism with a reduced basic cost of the overall product while increasing a rotation force of the cover to make it easy to manufacture and assemble the button cover holding mechanism.

It is further another object of the present invention to provide a button cover holding mechanism as part of a miniaturized and lightened overall product by simplifying the construction and structure thereof.

To achieve these and other objects, the present invention provides a button cover holding mechanism of a portable telephone, in which a cylindrical bush, a cylindrical ring and a spring are inserted into both circular holes of a button cover, covered with a cover mounting projection, and sealed by an ultrasonic connection process; such that an opposite cylindrical ring is inserted into a reception guide rail of a body by positioning the cylindrical bush of the button cover toward a projection bar of the body, and the cylindrical bush and the cylindrical ring are outwardly positioned by a restoring force of the spring so that a trough portion of the cylindrical bush is assembled to be in contact with the projection bar; wave projections of the cylindrical bush and the projection bar of the body are in contact with each other, to directly apply the restoring force of the spring to the cylindrical bush; and the restoring force generated by changes in the moving distance of the spring according to a phase of the cylindrical bush cause a moment for rotating the button cover, to open and close the button cover.

BRIEF DESCRIPTION OF THE DRAWINGS

The following is a detailed description of the invention with reference to the attached drawings, in which like numbers indicate the same or similar elements.

DETAILED DESCRIPTION OF PREFERRED EMBODIMENTS

In the following, illustrative embodiments and the operation of the button cover holding mechanism according to the present invention will be described with reference to the attached drawings.

Figure 1:
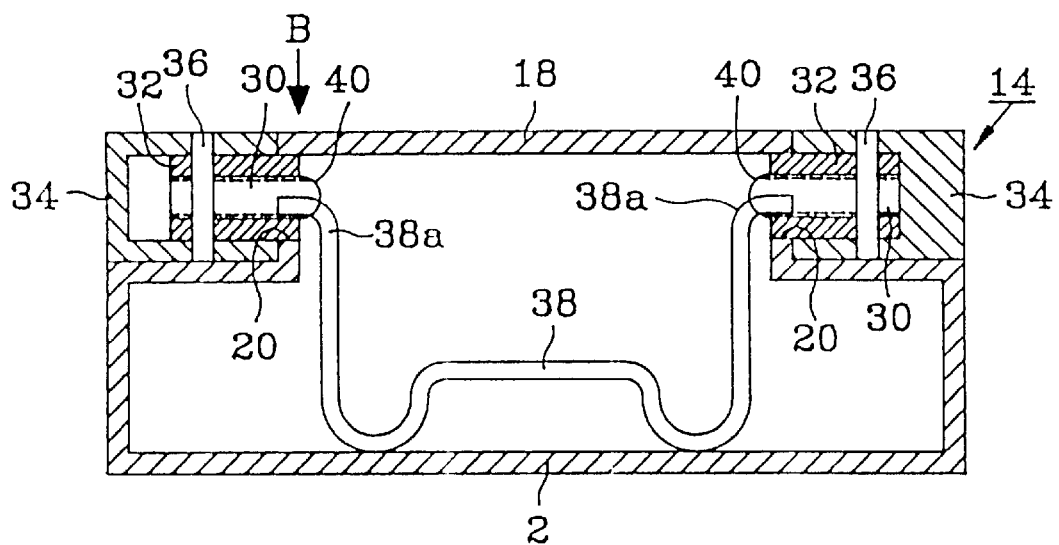
FIG. 1 is a vertical sectional view illustrating a construction of a cover holding mechanism in the prior art.
Figure 2:
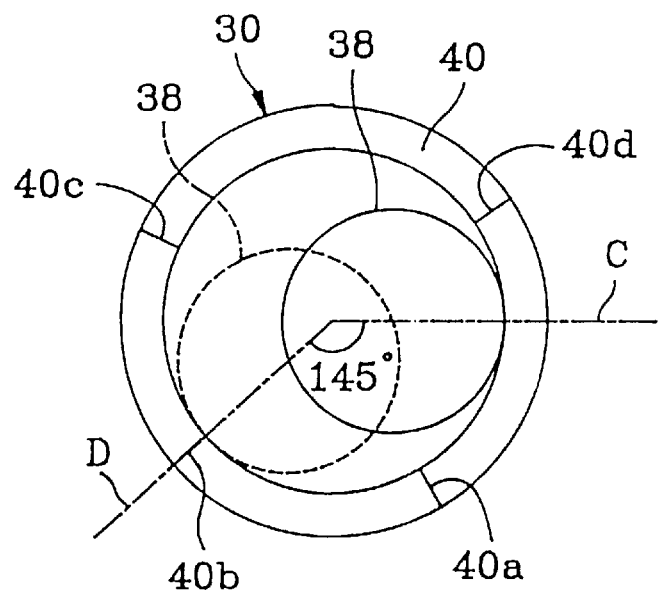
FIG. 2 is a front elevational view illustrating a wave cam in the prior art shown in FIG. 1.
Figures 3, 4:
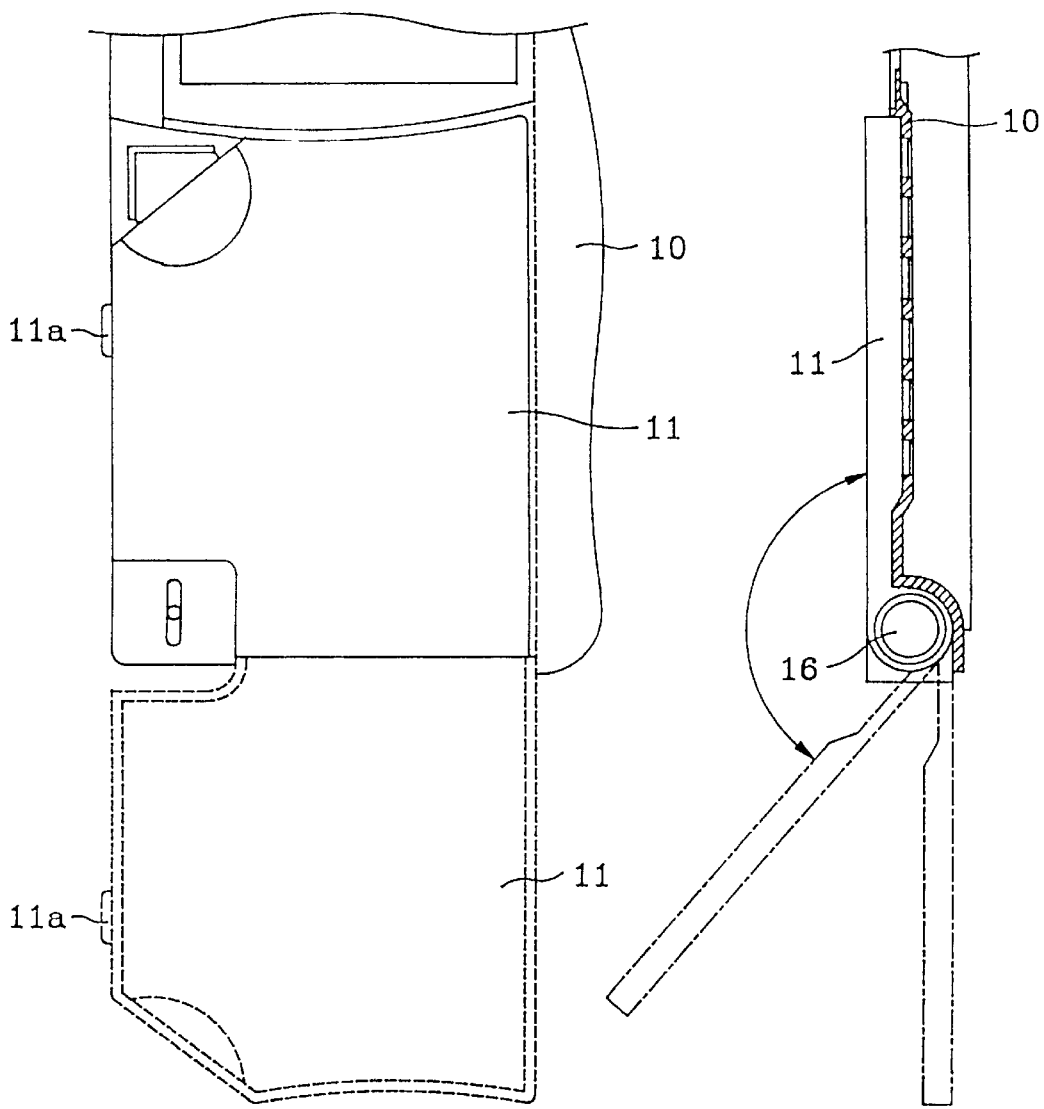
FIG. 3 is a view schematically illustrating an exemplary embodiment of a portable telephone according to the present invention.
FIG. 4 is a view illustrating an operative state of a button cover of the portable telephone according to the present invention.
Figure 5:
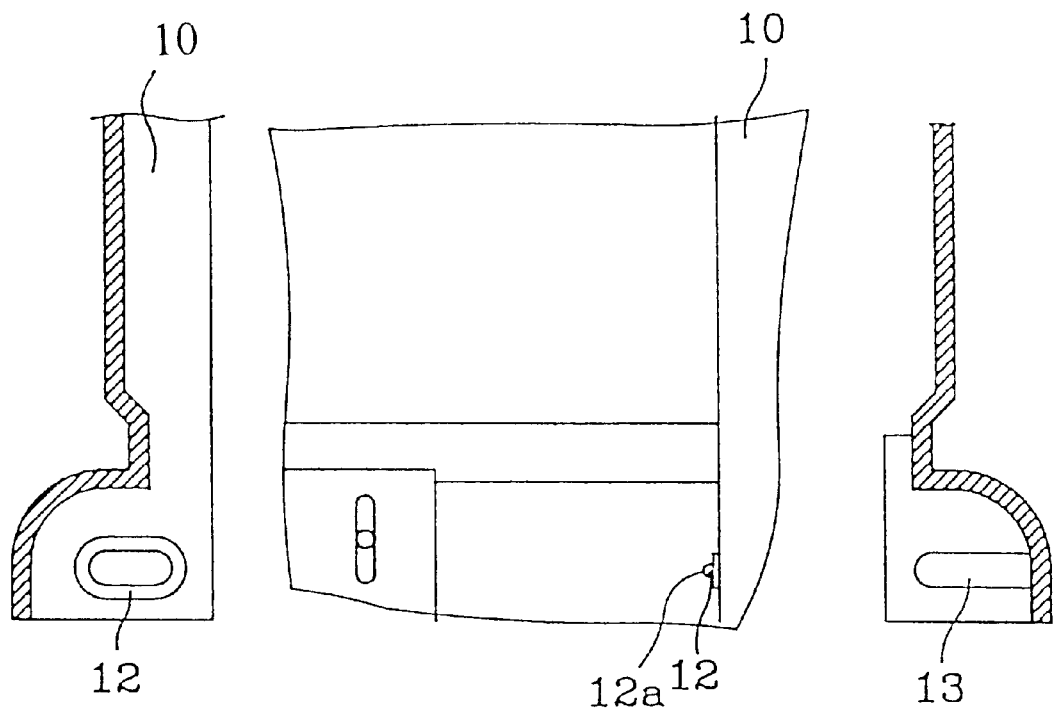
FIG. 5 is a view illustrating an exemplary embodiment of the elements of a body shown in FIGS. 3 and 4 according to the present invention.
Figure 5:
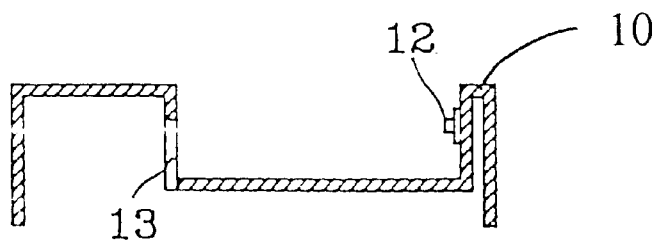
Figure 6:
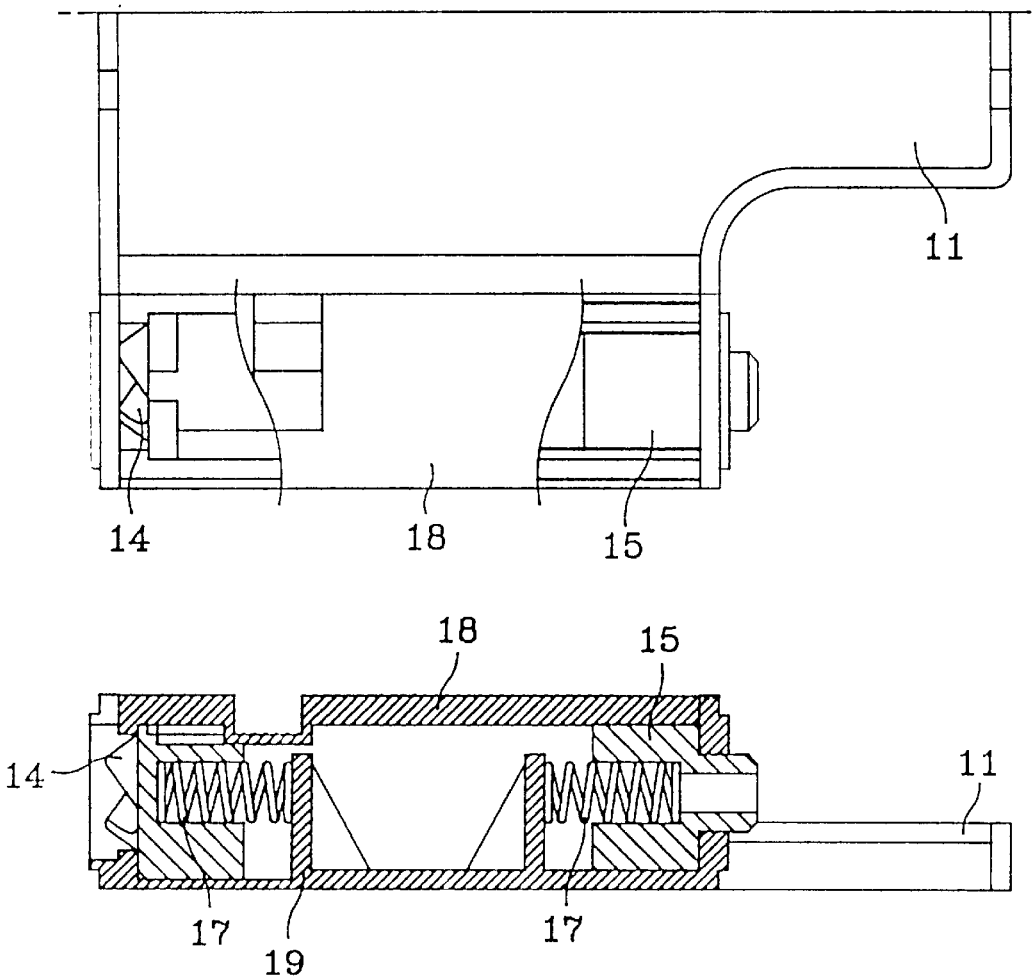
FIG. 6 is a vertical sectional view illustrating the button cover shown in FIGS. 3 and 4 according to the present invention.
Figure 7:
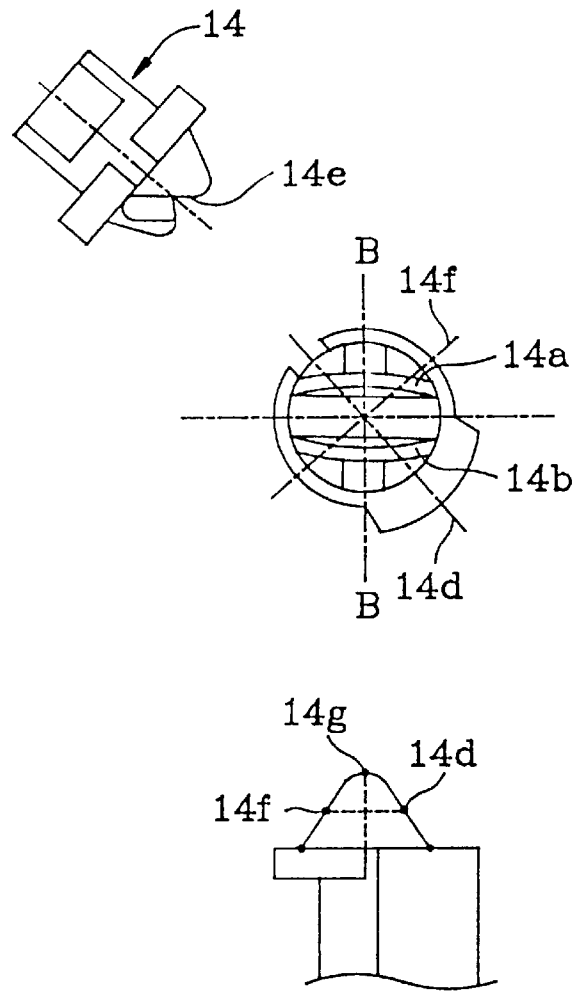
FIG. 7 is a view illustrating a state of a wave projection and a trough portion of a cylindrical bush according to the present invention.
Figure 8:
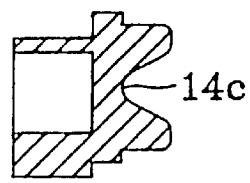
FIG. 8 is a sectional view illustrating a wave cam along line B—B shown in FIG. 7.

As shown in FIGS. 3 and 4, a portable telephone includes a body 10 and a button cover 11, with more detailed descriptions of the body 10 and the button cover 11 described with reference to FIGS. 5 to 8. The body 10 is provided with a reception guide rail 13 and a projection bar 12 for controlling the rotation of the button cover 11, and the button cover 11 horizontally engages the projection bar 12 of the body 10. The cylindrical bush 14 and a cylindrical ring 15 are seated in a circular hole 16, in which one end of the cylindrical bush 14 is provided with wave projections 14a and 14b, and the trough portion 14c is formed between the wave projections 14a and 14b. The cylindrical ring 15 acts as a center axis for rotation in engagement with the an elongated reception guide rail 13 of the body 10. Also, an elastic spring 17 provides control of angular orientation and a moment with the cylindrical bush 14 at the time of a rotation operation. The cover mounting projection 18 is connected with the button cover 11 by an ultrasonic connection technique so as to prevent detachment of the cylindrical bush 14, the cylindrical ring 15 and the spring 17 from one another when the button cover is operated or when an impact is applied to the button cover. The button cover 11, the cylindrical bush 14, the cylindrical ring 15, the spring 17 and the cover mounting projection 18 are integrally formed by the ultrasonic connection technique, and horizontal operation of the cylindrical bush 14 is performed by the spring 17 providing a restoring force to the button cover 11. The projection bar 12 also includes a support 19, a projection 11a and a crest 12a.

After the cylindrical bush 14 and the cylindrical ring 15 together with the spring 17 are inserted into both circular holes 16 of the button cover 11 and then are covered with the cover mounting projection 18, they are sealed by the ultrasonic connection technique.

In order to assemble the assembled button cover 11 to the body 10, the cylindrical bush 14 of the button cover 11 is positioned toward the projection bar 12 of the body 10. If the button cover 11 is pushed as an opposite cylindrical ring 15 is pressed, the cylindrical ring 15 is entirely fitted into the elongated reception guide rail 13 of the body 10 by the restoring force of the spring 17. The cylindrical bush 14 is outwardly moved, so that the trough portion 14c of the cylindrical bush 14 is assembled in contact with the projection bar 12.

The wave projections 14a and 14b of the cylindrical bush 14 and the projection bar 12 of the body 10 are in contact with each other, to directly apply the restoring force of the spring 17 to the cylindrical bush 14. The restoring force generated by changes in a moving distance of the spring 17 according to the phase of the cylindrical bush 14 causes a moment for rotating the button cover 11. As a result, the operation of the button cover 11 is achieved.

In the operation of the button cover 11, when the button cover 11 is opened as illustrated in FIG. 4, as a movement of the cylindrical bush 14 which is in contact with the projection bar 12 of the body 10 at an inclined middle point 14d is backwardly pushed along with a 45°-inclined surface 14e, the projection bar 12 leads to the crest portion 14g of the cylindrical bush 14. After the projection bar 12 escapes from the crest portion 14g, a driving force for downward sliding the projection bar 12 along with an inclined surface 14f acts by the spring 17 to generate the restoring force, so that the projection bar 12 slides along with the inclined surface 14f, even though an external force is eliminated, to open the button cover 11. As a result, when the trough portion 14c of the cylindrical bush 14 and the projection bar 12 of the body 10 are aligned to each other (that is, the projection bar 12 is in contact with the trough portion 14c of the cylindrical bush 14), the operation of the button cover 11 is prevented, to maintain the angle between the body 10 and the button cover 11 for facilitating operation of the portable telephone to place a call.

When the button cover 11 is closed, if the button cover 11 is raised, the cylindrical bush 14, which is in contact with the projection bar 12 of the body 10 at the trough portion 14c, is slidingly raised along with the inclined surface 14f. If the crest 12a of the fixed projection bar 12 of the body 10 escapes from the crest portion 14g of the cylindrical bush, an opposite driving force for downwardly sliding the projection bar 12 along with an inclined surface 14e of the cylindrical bush 14 is caused by the spring 17 to generate the restoring force, so that the projection bar 12 slides along with the inclined surface 14e, even though an external force is eliminated, to close the button cover 11. At this time, the elastic force of the spring 17 is applied to the button cover 11, to maintain the button cover holding mechanism in the closed condition.

As described above, the button cover holding mechanism according to the present invention has advantages in which, when the button cover of the portable telephone is in the open condition, the angle between the body and the button cover is constantly maintained to make it possible to place a call. When the button cover is placed in the closed condition, the closed condition of the button cover is maintained, and it is convenient for the user to open and close the button cover by varying a phase of the cylindrical bush, which enhances convenience for the user and provides a miniaturized and lightened product by simplifying the construction and structure of the button cover holding mechanism.

While there have been illustrated and described what are considered to be preferred embodiments of the present invention, it will be understood by those skilled in the art that various changes and modifications may be made, and equivalents may be substituted for elements thereof without departing from the spirit and scope of the present invention.

What is claimed is:

1. A button cover holding mechanism of a portable telephone which has a button cover with a plurality of circular holes therein, and has a body having a projection bar, comprising:

the body having an elongated reception guide rail formed therein;

a cylindrical bush, a cylindrical ring and a spring inserted into the circular holes of the button cover, covered with a cover mounting projection, and sealed by an ultrasonic connection technique;

wherein the cylindrical ring is inserted into the elongated reception guide rail of the body by positioning said cylindrical bush toward a projection bar of said body, said cylindrical bush and said cylindrical ring are outwardly positioned by a restoring force of said spring to fit the cylindrical ring in the elongated reception guide rail, and a trough portion of said cylindrical bush is assembled to contact said projection bar;

wherein said cylindrical bush includes wave projections, and said projection bar of said body is in contact with the wave projections to directly apply said restoring force of said spring to the cylindrical bush; and wherein said restoring force is generated by a change in a moving distance of said spring according to a phase of said cylindrical bush which causes a moment for rotating said button cover, for facilitating opening and closing said button cover.

2. The button cover holding mechanism as in claimed in claim 1, wherein an inclined middle portion of said cylindrical bush is in contact with said projection bar of said body when said button cover is in the closed position, and said trough portion of said cylindrical bush is in contact with said projection bar when said button cover is in the open position at a predetermined angle.

3. A portable telephone having telephone circuitry including a plurality of buttons for use thereof, the portable telephone comprising:

a button cover with a plurality of circular holes therein, with the button cover for covering the plurality of buttons; and a body having an elongated reception guide rail and a projection bar; and a button cover holding mechanism including:
a button mounting projection;
a bush including projections in contact with the projection bar and having a trough portion between said projections;
a ring positioned in the elongated reception guide rail; and
a resilient member for applying a restoring force to the bush and for fitting the ring in the elongated reception guide rail;
wherein each of the bush, the ring, and the resilient member is positioned in the circular holes of the button cover and covered with the cover mounting projection.

4. The portable telephone of claim 3 wherein the resilient member is a spring which generates the restoring force by a change in a moving distance of the spring for rotating the button cover for facilitating opening and closing the button cover.

5. The portable telephone of claim 3 wherein the projections of the bush include wave projections.

6. The portable telephone of claim 3 wherein the bush and the ring are outwardly positioned by the restoring force of the resilient member, and said trough portion of the bush contacts the projection bar.

7. The portable telephone of claim 3 wherein the bush, the ring, and the resilient member are sealed in the cover mounting projection by an ultrasonic connection technique.

8. A button cover holding mechanism of a portable telephone which has a button cover with a plurality of circular holes therein, and which has a body having a projection bar, the button cover holding mechanism formed by a process comprising the steps of:

inserting a cylindrical bush into the circular holes;

inserting a cylindrical ring into the circular holes;

inserting the cylindrical ring into an elongated reception guide rail of the body;

inserting a spring into the circular holes to apply a restoring force to the cylindrical ring to fit the cylindrical ring into the elongated reception guide rail;

covering the cylindrical bush, the cylindrical ring, and the spring with a cover mounting projection; and sealing the cylindrical bush, the cylindrical ring, and the spring in the cover mounting projection.

9. The button cover holding mechanism formed by the process of claim 8 wherein the step of sealing includes the step of:

sealing the cylindrical bush, the cylindrical ring, and the spring in the cover mounting projection by an ultrasonic connection technique.

10. The button cover holding mechanism formed by the process of claim 8 wherein the step of inserting the cylindrical bush includes the step of:

positioning the cylindrical bush toward a projection bar of the body.

11. The button cover holding mechanism formed by the process of claim 8 further including the step of:

outwardly positioning the cylindrical bush and the cylindrical ring by a restoring force of the spring.

12. The button cover holding mechanism formed by the process of claim 8 further including the steps of:

positioning a trough portion of the cylindrical bush to contact the projection bar; and positioning the projection bar of the body to be in contact with wave projections of the cylindrical bush to directly apply a restoring force of the spring to the cylindrical bush.

13. The button cover holding mechanism formed by the process of claim 12 further including the steps of:

providing a change in a moving distance of the spring;

causing a moment for rotating the button cover; and generating the restoring force for facilitating opening and closing the button cover.

* * * * *